Aug. 16, 1966

W. J. SAFFORD 3,266,821

SEALED PIPE COUPLING

Filed Jan. 14, 1964

INVENTOR.
William J. Safford
BY Bertram H. Mann
ATTORNEY

Aug. 16, 1966 W. J. SAFFORD 3,266,821
SEALED PIPE COUPLING
Filed Jan. 14, 1964 2 Sheets-Sheet 2

INVENTOR.
William J. Safford
BY Bertram N. Mann
ATTORNEY

United States Patent Office

3,266,821
Patented August 16, 1966

3,266,821
SEALED PIPE COUPLING
William Joseph Safford, 3510 Durhill, Houston, Tex.
Filed Jan. 14, 1964, Ser. No. 337,629
2 Claims. (Cl. 285—40)

This invention relates to sealing couplings for threaded pipe ends.

There is a demand for a coupling which will sealingly interconnect pipe ends having standard threads and, particularly, where the pipe is of the internally coated variety. Unless the sealing means is located between the coupling sleeve and the adjacent threaded ends of the joined pipe, the fluid carried by the pipe may leak around the pipe ends and cause corrosion and erosion. Furthermore, a metal sealing ring formed within the coupling sleeve for abutment by the ends of the pipe would result in damage to the pipe lining material which, customarily, overlies the pipe ends.

Accordingly, an object of the present invention is to provide a novel sealed pipe coupling which effectively prevents the incursion of the piped fluid between the pipe ends and the coupling.

Another object is to provide a sealed coupling with means for protecting pipe coating material which overlies the ends of the pipe.

Another object is to provide a simplified assembly procedure for sealed pipe couplings.

According to the present invention a coupling sleeve having more or less conventional internal threads at each end is provided with an internal annular recess between the threads. A sealing collar of Teflon or other resistant and resilient plastic material is sealingly lodged within this groove. An extremely simple and convenient way of mounting the ring within the sleeve is to lower its temperature to cause sufficient thermal contraction thereof so that the ring can be readily inserted. Thereafter, the warming of the ring to ambient temperature causes thermal expansion into firm lodgment within the groove. The ring has a central inwardly projecting annular rib or ring forming shoulders against which the threaded pipe ends abut and also has endwardly projecting tubular parts, in effect, forming extensions of the internal end threads of the coupling sleeve so that the threaded pipe ends, in being drawn against the annular plastic ring are threaded upon these tubular parts. Thus, a very tight seal is effected between the pipe ends and the sleeve which effectively prevents the intrusion of pipe fluid between these parts.

In the accompanying drawings which illustrate the invention,

Figure 1:
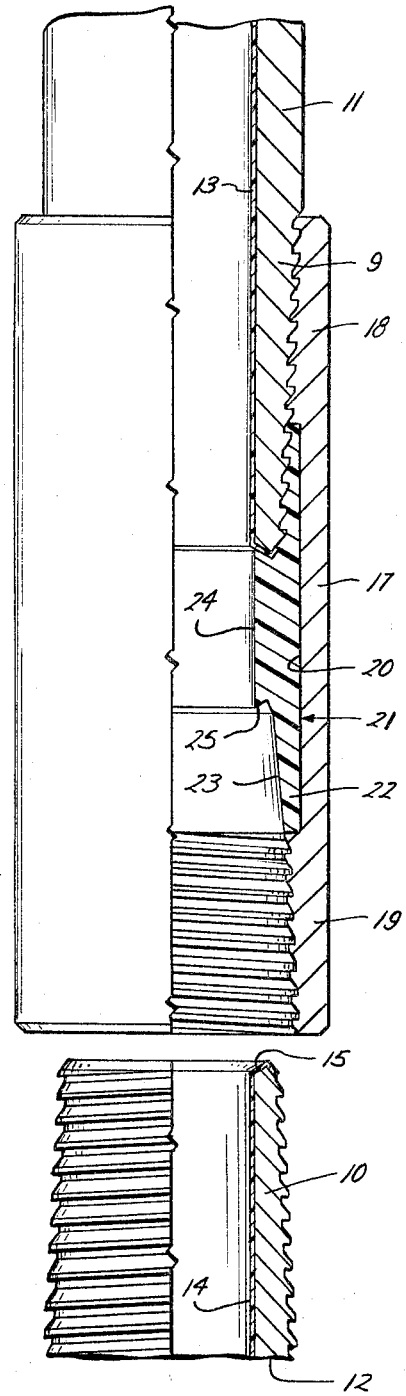
FIG. 1 shows a pair of threaded end portions 9 and 10 a partially assembled pipe coupling embodying the invention.

FIG. 1 shows a pair of thread end portions 9 and 10 of pipes 11 and 12 having thin, plastic internal coatings 13 and 14. The coatings extend around the ends of pipe portions 9 and 10, as at 15. These pipe ends are of generally V-section for a purpose to be described.

Pipe portion 9 is shown threaded into a coupling sleeve 17 having internally buttress threaded end portions 18 and 19 which mate with externally threaded pipe ends 9 and 10. An annular recess 20 is provided in the inner wall of sleeve 17 between the threaded end parts thereof. Sealingly lodged within recess 20 is a monolithic collar 21 of suitable pliable sealing material such as the relatively hard, polymerized tetra-fluorethylene plastic commercially known as Teflon. The collar, initially, has tubular end portions, as 22, with slightly tapered, smooth inner surfaces, as 23, which, in the assembly, form virtual continuations of the threaded inner surfaces of sleeve end portions 18 and 19. Between these end portions is an inwardly projecting annular rib or ring portion 24, forming endwardly facing shoulders, as 25. In the present form, these edge shoulders, initially, are undercut to form generally V-section or dovetail annular grooves complementary, to the contour of the liner coated ends of pipe end portions 9 and 10.

The assembly of sealing collar 21 with sleeve 17 may be most easily effected by cooling the collar sufficiently to reduce the diameter thereof so that the collar may be inserted through the sleeve ends and into annular recess 20. Thereafter, warming of the collar to ambient temperature will result in thermal expansion which causes firm sealing lodgment of the collar within the recess. The Teflon material is of sufficient resilience and pliability that the pipe end threads can be threaded into tubular end portions 22 of the collar, as shown at the upper portion of FIG. 1. Ultimately, the pipe ends are drawn firmly against ring shoulders 25 so as to cooperate with the mentioned threading to form extremely tight seals between the ends of the pipes and the coupling sleeve. The nature of the Teflon will permit repeated removal and rethreading of the joint without loss of its sealing properties.

Figure 2:
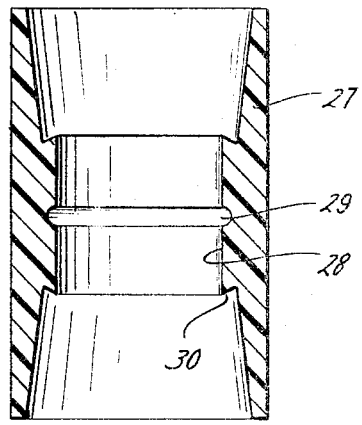
FIG. 2 is a longitudinal section illustrating a modified coupling sleeve insert.
Figure 3:
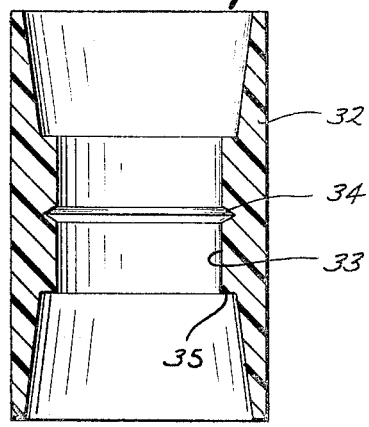
FIGS. 3, 4, 5 and 6 are sectional views illustrating other forms of the coupling sleeve inserts.
Figure 4:
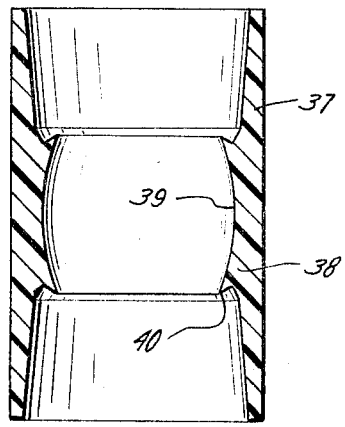
Figure 5:
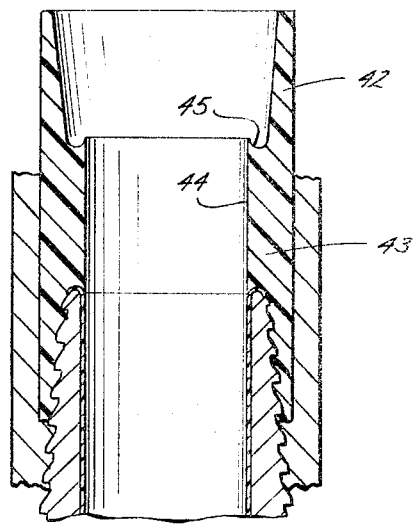

FIGS. 2, 3, 4, 5 and 6 show insert collars of slightly different configurations. In FIG. 2 annular ring portion 28 has a central annular groove 29, half circular in section, which facilitates longitudinal contraction of the ring, when the pipe ends are drawn thereagainst, without substantial radial distortion thereof. Shoulders 30 are of generally V-section or dovetail shape and slightly undercut. In FIG. 3, insert 32 has a central ring 33 with an internal recess 34 of V-section. End shoulders 35 are normal to the axis of the part. In FIG. 4, insert collar 37 has a central ring 38 with a concavely curved inner face 39 which serves the same general purpose as grooves 29 and 34 in the previous forms, that is, to prevent substantial radial distortion of the insert in the assembly. End shoulders 40 are of undercut construction, somewhat as in FIG. 1. In FIG. 5 insert collar 42 has a central ring 43 with a cylindrical inner face 44 and semi-circularly curved end shoulders 45. In this form, there would be sufficient distortion of the end shoulder parts to provide the proper seal with the pipe ends without substantial longitudinal compression of ring 43 with resultant radial distortion thereof.

Figure 6:
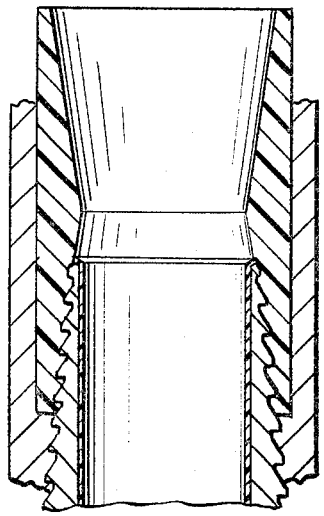

In FIG. 6 insert collar 47 has oppositely tapered, frusto-conical inner walls 48 and 49 which meet in an apex line 50 centrally of the insert. In this form, it is contemplated that the threading of pipe end parts, as 51, into the pliable sealing collar will be sufficient to provide for a proper seal.

Figure 7:
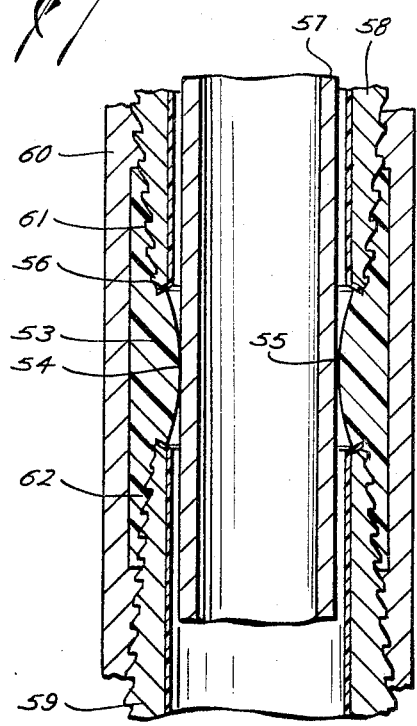
FIG. 7 is a view of still another form of coupling showing in dotted lines an internal tubular member which is gripped by the sleeve upon threading of pipe ends into sealing engagement with the plastic collar.

In FIG. 7, the insert collar 53 has a central ring 54 which is convexly curved, as at 55, and has dovetail end shoulders as 56. A tubular member 57 is shown run through the coupling, as for the purpose of suspending a tool or instrument within oil well tubing in which the coupling is installed. In the assembly, pipe ends 58 and 59 are threaded into coupling sleeve 60, and the tubular end parts 61 and 62 of the insert collar, as in the previous forms. However, ring 54 is designed to be radially distorted in the assembly so as to grip tubular member 54 run therethrough. Thus, the insert collar serves the dual purpose of effectively sealing the joint between pipe ends 58 and 59 and the coupling sleeves and also serves as a centralizer and/or packer for and about tubular member 57.

Strong threads should be provided in the coupling sleeves and pipe ends to provide adequate strength for forming the threads in and squeezing the insert collar so as to insure a proper seal. Buttress threads are suitable for this purpose, but other thread configurations, of course, may be used. The actual configuration of the insert sleeve, and particularly the shouldered internal ring therein, may be modified in accordance with particular pipe end shapes and other requirements. Moreover, the particular material used in making the sealing sleeve will depend somewhat upon the characteristics of the material which the piping is intended to transport as well as its pressure. The invention may be modified in these and other respects as will occur to those skilled in the art and the exclusive use of all modifications as come within the scope of the appended claims is contemplated.

I claim:

1. A sealed pipe coupling assembly comprising a coupling sleeve having internal threads at its ends, a monolithic collar of yielding material sealingly lodged within said sleeve between said end threads, said collar having initially unthreaded tubular end portions and a central internal ridge with inclined edge walls forming annular V-grooves, and a pair of pipe members with inclined end walls of V-section complementary to said edge grooves in said collar and circumferentially continuous internal synthetic resinous linings overlying said end walls, said linings having a coefficient of friction relative to said collar sufficiently low to permit rotary contact without scrubbing, said pipe members having external end threads for mating with said internal threads in said sleeve, for cutting threads in said end portions of said collar, and for causing said lined pipe end walls to sealingly abut said complementary ridge grooves, said collar being of sufficient hardness to facilitate formation of stable threads therein during assembly of said pipe members therewith and being adapted to accommodate frictional engagement between said lined pipe ends and said V-grooves.

2. A sealed pipe coupling assembly, as described in claim 1, in which said collar ridge is provided with an annular groove in its inner face to accommodate cold flowing of said ridge upon distortion thereof.

References Cited by the Examiner

UNITED STATES PATENTS

| | | | |
|---|---|---|---|
| 278,800 | 6/1883 | Kline | 285—355 X |
| 595,437 | 12/1897 | Greenfield | 285—55 X |
| 1,101,084 | 6/1914 | McCarty | 29—447 |
| 1,226,921 | 5/1917 | Stewart | 285—355 X |
| 1,568,993 | 1/1926 | Newsom | 285—55 |
| 1,987,341 | 1/1935 | Kachel | 29—447 |
| 2,353,477 | 7/1944 | Koppel | 285—355 X |
| 2,533,885 | 12/1950 | Hill | 285—355 X |
| 3,100,656 | 8/1963 | MacArthur | 285—55 |

FOREIGN PATENTS

| | | |
|---|---|---|
| 883,048 | 3/1943 | France. |
| 828,783 | 1/1952 | Germany. |
| 1,022,860 | 1/1958 | Germany. |

CARL W. TOMLIN, *Primary Examiner.*

EDWARD C. ALLEN, *Examiner.*

D. W. AROLA, *Assistant Examiner.*

UNITED STATES PATENT OFFICE
CERTIFICATE OF CORRECTION

Patent No. 3,266,821                              August 16, 1966

William Joseph Safford

It is hereby certified that error appears in the above numbered patent requiring correction and that the said Letters Patent should read as corrected below.

Column 1, line 52, strike out "shows a pair of threaded end portions 9 and 10", and insert instead -- is a side view and longitudinal half section of --; line 63, for "thread" read -- threaded --; column 2, line 14, strike out the comma.

Signed and sealed this 1st day of August 1967.

(SEAL)
Attest:

EDWARD M. FLETCHER, JR.                     EDWARD J. BRENNER
Attesting Officer                                         Commissioner of Patents